(12) United States Patent
Weng et al.

(10) Patent No.: US 9,710,422 B2
(45) Date of Patent: Jul. 18, 2017

(54) LOW COST LOW OVERHEAD SERIAL INTERFACE FOR POWER MANAGEMENT AND OTHER ICS

(71) Applicant: Intel Corporation, Santa Clara, CA (US)

(72) Inventors: Sheldon Weng, Lake Oswego, OR (US); George E. Matthew, Hillsboro, OR (US); Pavan Kumar, Portland, OR (US); Wayne L. Proefrock, Hillsboro, OR (US); Harish K. Krishnamurthy, Hillsboro, OR (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 287 days.

(21) Appl. No.: 14/570,898

(22) Filed: Dec. 15, 2014

(65) Prior Publication Data

US 2016/0170930 A1 Jun. 16, 2016

(51) Int. Cl.
*G06F 13/42* (2006.01)
*G06F 13/364* (2006.01)
*G06F 13/40* (2006.01)
*G06F 1/32* (2006.01)
*G06F 1/26* (2006.01)

(52) U.S. Cl.
CPC ............ *G06F 13/4282* (2013.01); *G06F 1/26* (2013.01); *G06F 1/3203* (2013.01); *G06F 1/3253* (2013.01); *G06F 13/364* (2013.01); *G06F 13/404* (2013.01); *G06F 2213/0052* (2013.01)

(58) Field of Classification Search
CPC ..................... G06F 13/4282; G06F 2213/0052
USPC ..................................... 710/9, 110
See application file for complete search history.

(56) References Cited

U.S. PATENT DOCUMENTS

| 4,689,740 | A | 8/1987 | Moelands et al. |
| 5,928,345 | A * | 7/1999 | Tetzlaff ............... G05B 15/02 340/3.5 |
| 6,553,437 | B1 * | 4/2003 | Aswell ............... G06F 13/4291 710/10 |
| 8,478,917 | B2 * | 7/2013 | Scott ................. G06F 13/4247 710/104 |
| 8,631,179 | B1 * | 1/2014 | Faulds ................ G06F 13/364 710/110 |

(Continued)

FOREIGN PATENT DOCUMENTS

| EP | 1323048 A | 7/2003 |
| WO | 02/25449 A2 | 3/2002 |

(Continued)

*Primary Examiner* — Glenn A Auve
(74) *Attorney, Agent, or Firm* — Alpine Technology Law Group LLC

(57) ABSTRACT

Methods and apparatus relating to low cost and/or low overhead serial interface for power management and other IC (Integrated Circuit) devices are described. In an embodiment, a unique address is assigned to each of a plurality of slave devices. The plurality of slave devices are coupled in a daisy chain configuration. And, any access directed at a first slave device from the plurality of slave devices is allowed based at least in part on comparison of an address of the first slave device and an address associated with the access. Other embodiments are also disclosed and claimed.

26 Claims, 9 Drawing Sheets

(56) References Cited

U.S. PATENT DOCUMENTS

| | | | |
|---|---|---|---|
| 8,645,580 B2* | 2/2014 | Koudar | G06F 13/4252 710/3 |
| 8,966,124 B1* | 2/2015 | Prusia | G06F 13/4256 710/10 |
| 2010/0185784 A1* | 7/2010 | De Nie | G05B 19/0423 710/9 |
| 2011/0119405 A1* | 5/2011 | Parr | G06F 13/37 710/4 |
| 2013/0212304 A1* | 8/2013 | Pyeon | G06F 12/0669 710/9 |
| 2014/0254431 A1* | 9/2014 | Yan | H04Q 11/04 370/255 |

FOREIGN PATENT DOCUMENTS

| | | |
|---|---|---|
| WO | 2004/034238 A2 | 4/2004 |
| WO | 2004/034238 A3 | 4/2004 |

* cited by examiner

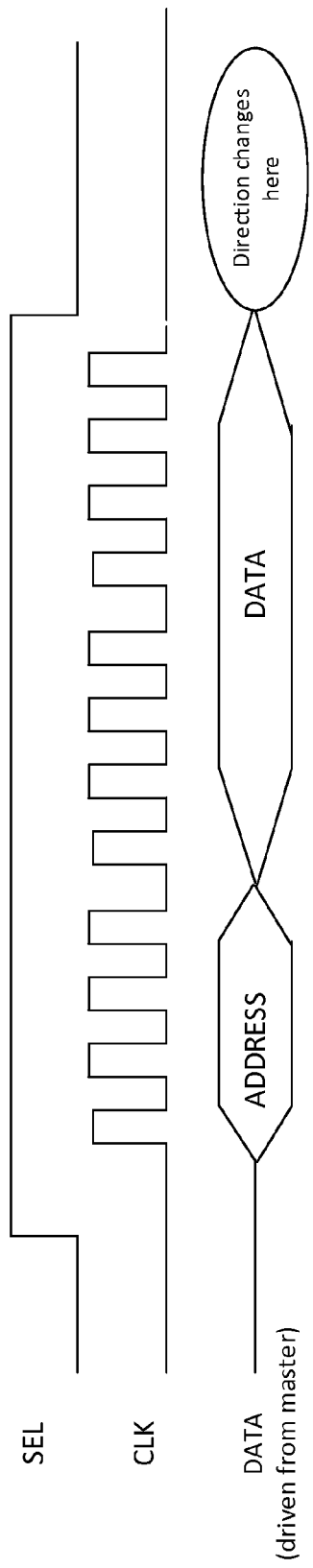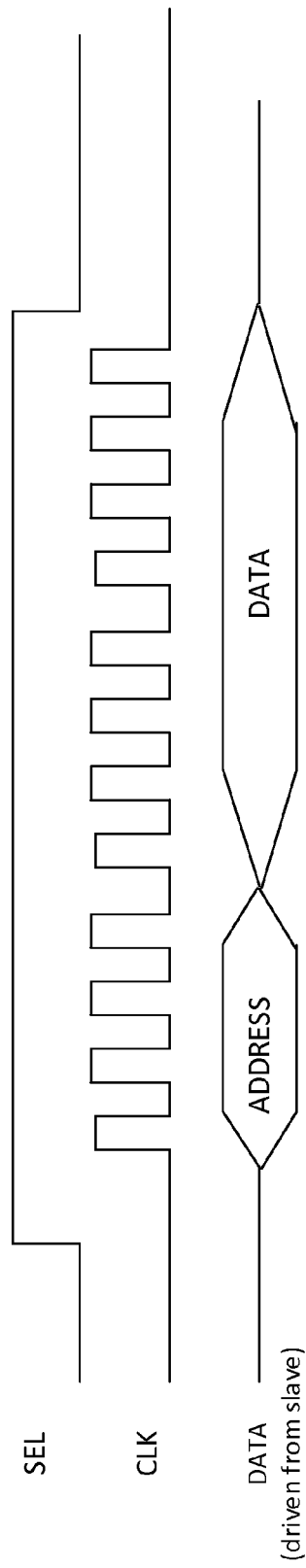

LOW COST LOW OVERHEAD SERIAL INTERFACE FOR POWER MANAGEMENT AND OTHER ICS

FIELD

The present disclosure generally relates to the field of electronics. More particularly, some embodiments relate to techniques for low cost and/or low overhead serial interface for power management and other ICs (Integrated Circuits).

BACKGROUND

One approach to address slave devices that are being accessed by a master is to use a communication protocol such as SMBus™ (System Management Bus) or I2C (Interface to Communicate). To support these protocols, each slave device generally includes address configuration pins, an internal flash memory, and/or individual chip selects. Such approaches, however, place additional implementation burdens on a product, such as increased cost and board routing, etc. Alternatively, use of a simple serial protocol that accesses all slave devices in a daisy chained manner (without specific addressing schemes) can be time consuming. For example, the time to access a particular slave in the chain grows linearly with the number of slaves devices.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 5 through 10 illustrate sample timing diagrams, according to some embodiments.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As discussed above, one approach to address slave devices that are being accessed by a master (such as a power management IC (Integrated Circuit) on a computing platform) is to use some standard protocol like SMBus™ (System Management Bus) or I2C (Interface to Communicate). To support these protocols, each slave device generally includes address configuration pins, an internal flash memory, and/or individual chip selects. Such approaches, however, place additional implementation burdens on a product, such as increased cost and board routing, etc. Alternatively, use of a simple serial protocol that accesses all slave devices in a daisy chained manner (without specific addressing schemes) can be time consuming. For example, the time to access a particular slave in the chain grows linearly with the number of slaves devices.

To this end, some embodiments provide a low cost and/or a low overhead serial interface for power management and/or other ICs (Integrated Circuits) components. For example, an embodiment provides a low cost and/or a low overhead addressing scheme to access slave device(s) implemented in a daisy chained fashion using a serial (or point-to-point) interface. Such embodiments are believed to reduce the access time associated with accessing slaves in a chain, even when the chain grows in size and without traditional burdens.

In an embodiment, a unique address is assigned to each slave device (e.g., at power on of a computing system). More specifically, the host or master may configure each slave with the unique address, which is then used for future access to the slave with the configured unique address. Furthermore, most other protocols may only perform single parity bit error checking (which can detect only one bit of error). By contrast, at least one embodiment provides an optional read-back mechanism that can confirm if the entire data written is correct, e.g., providing a level of error checking far beyond the aforementioned single parity bit error checking. Further, the read-back mechanism may be optionally turned off or on for every transaction.

Figure 1:
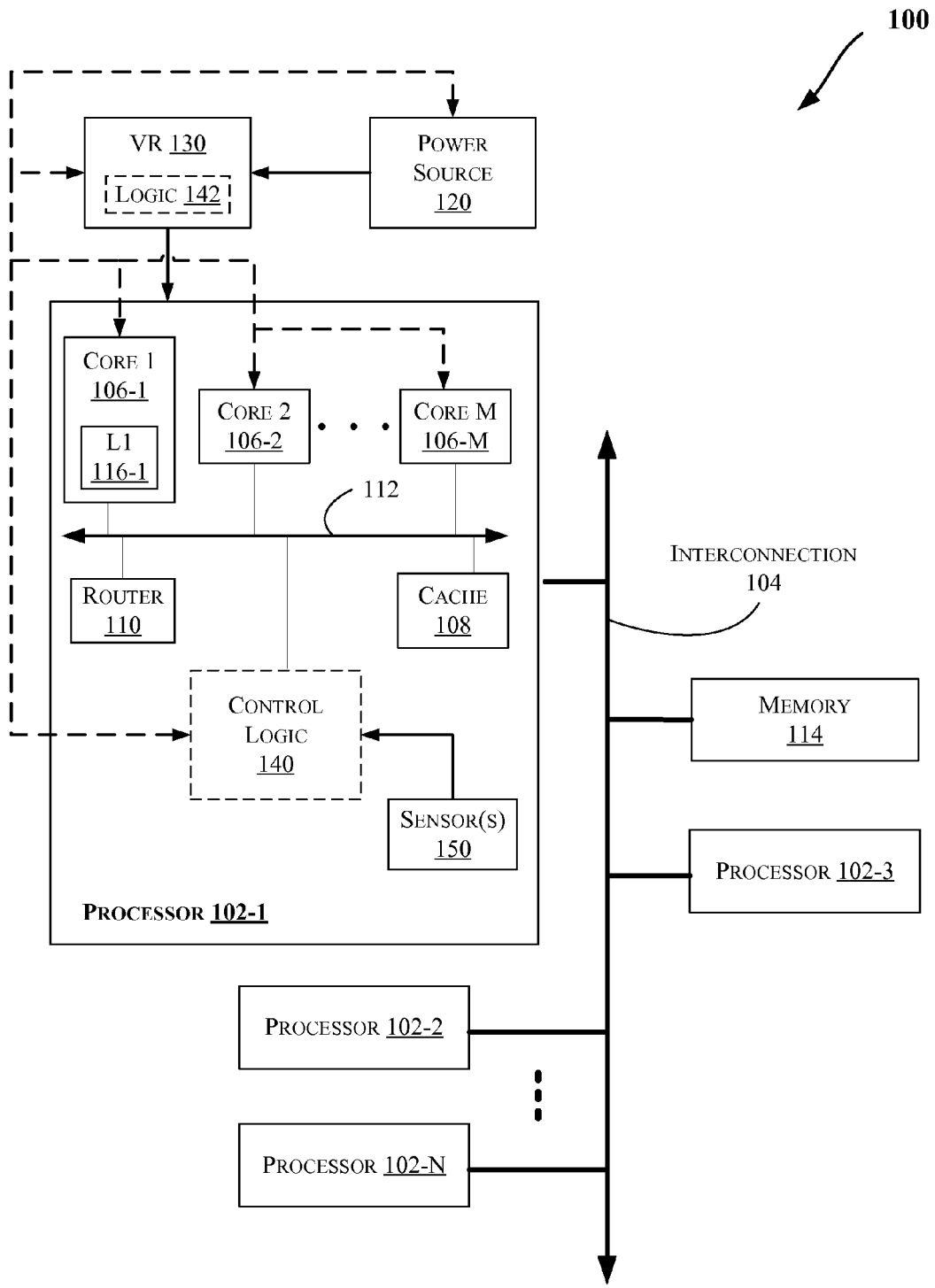
FIGS. 1 and 11-13 illustrate block diagrams of embodiments of computing systems, which may be utilized to implement various embodiments discussed herein.

As discussed herein, some embodiments may be applied in computing systems that include one or more processors (e.g., with one or more processor cores), such as those discussed with reference to FIGS. 1-13, including for example mobile computing devices such as a smartphone, tablet, UMPC (Ultra-Mobile Personal Computer), laptop computer, Ultrabook™ computing device, smart watch, smart glasses, wearable devices, etc., and/or larger systems such as computer servers with many cores, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip or device. Moreover, the chip may include one or more shared and/or private caches (such as cache 108), buses or interconnections (such as a bus or interconnection 112), graphics and/or memory controllers (such as those discussed with reference to FIGS. 11-13), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a (e.g., platform) power source 120 (e.g., a Direct Current (DC) power source or an Alternating Current (AC) power source) to provide power to one or more components of the system 100. The power source 120 could include a PV (Photo Voltaic) panel, wind generator, thermal generator water/hydro turbine, etc. In some embodiments, the power source 120 may include one or more battery packs (e.g., charged by one or more of a PV panel, wind generator, thermal generator water/hydro turbine, plug-in power supply (for example, coupled to an AC power grid), etc.) and/or plug-in power supplies. The power source 120 may be coupled to components of system 100 through a Voltage Regulator (VR) 130. Moreover, even though FIG. 1 illustrates one power source 120 and a single voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 includes control logic 140 to support a low cost and/or a low overhead serial interface for power management and/or other IC devices (such as various components of the processor 102). While system 100 shows logic 140 to be included in the processor 102, logic 140 may be located elsewhere in system 100, e.g., directly coupled to the interconnection 104, inside or coupled to VR 130, inside or coupled to the power source 120, inside or coupled to power management logic (such as Power Management Unit (PMU), etc. Furthermore, logic 140 can be implemented as a Power Management Unit (PMU) in an embodiment. In one embodiment, logic 140 is provided on a Reprogrammable Power Management IC (RPMIC). Such RPMIC implementation may be used in low power devices (such as mobile computing devices discussed herein) through larger computers (e.g., desktop computers, computer servers, etc.), including, for example, the computing systems discussed herein with reference to FIG. 1 or 11-13. In an embodiment, a slave is designed for operation on a PTIC (Power Train IC) slave (e.g., used as part of RPMIC); however, techniques discussed herein may be extended to any type of serial interface.

Further, logic 140 may have access to one or more storage devices discussed herein (such as cache 108, L1 cache 116, memory 114, or another memory in system 100) to store information relating to operations of logic 140, including, for example, information communicated with various components of system 100 as discussed herein. Moreover, the logic 140 may be coupled to the VR 130 and/or other components of system 100 such as the cores 106 and/or the power source 120.

Additionally, logic 140 is coupled to logic 142 (e.g., via a serial bidirectional coupling or pin). Logic 142 may include a serial shift register. While logic 142 is shown inside VR 130 in FIG. 1, logic 142 may be included inside (or coupled to) any slave device that is to be configured by logic 140. Moreover, at power on (or reset), all slaves may appear as a serial daisy chain configuration, as will be further discussed herein, e.g., with reference to FIGS. 2-10. The host device (also referred to herein interchangeably as "master" or "logic 140") configures the slaves (e.g., VR 130 via logic 142) with an address of n bits, and then writes m bits of data to the slaves. Accordingly, the shift register (e.g., logic 142) within the slave devices may include two sections: (1) n bits of address (and one bypass bit); and (2) m bits of data payload.

Referring to FIG. 1, various components of system 100 may be coupled to receive information (e.g., in the form of one or more bits or signals) to indicate status of one or more sensors 150. The sensor(s) 150 may be provided proximate to components of system 100, including, for example, the cores 106, interconnections 104 or 112, components outside of the processor 102 (like VR 130 and/or power source 120), etc., to sense variations in various factors effecting power/thermal behavior of the system/platform, such as temperature, operating frequency, operating voltage, power consumption, and/or inter-core communication activity, etc.

Figure 2:
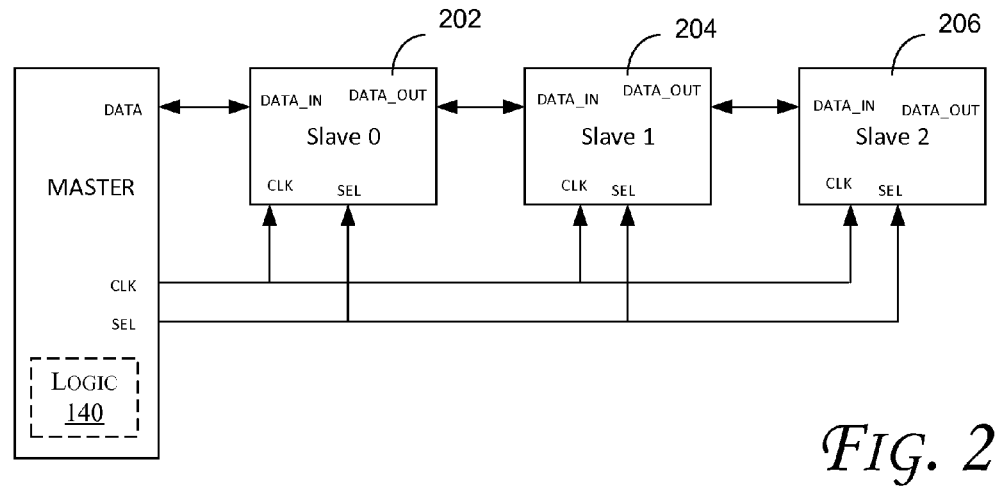
FIG. 2 illustrates a block diagram of master-slave system, according to an embodiment.

FIG. 2 illustrates a block diagram of portions of interconnection between a master and multiple slaves, according to an embodiment. While FIG. 2 shows three slaves, more or less slaves may be used in various embodiments. As shown, the master includes logic 140 and each slave includes logic 142 (e, g., implemented as serial/linear shift registers 202-206). The shift registers 202-206 are configured in a daisy chain configuration as shown. The direction of arrows in FIG. 2 illustrates the possible direction of information/data flow.

Moreover, the host/master device has three outputs; namely, clock (CLK), select (SEL), and data (DATA). Each slave device has three inputs; namely, clock, select, and data in (DATA_IN), and one output data (DATA_OUT). Each slave can receive data only when SEL is 1 (or asserted). When SEL is 0 (or not asserted), CLK and DATA_IN are ignored. When SEL is asserted, data is received serially by each slave, e.g., on the positive or negative edge of the clock depending on the implementation. The host changes its data (e.g., on the falling or rising) edge of the clock that it generates.

Further, at power on (or reset), the host device (e.g., logic 140 of master) configures the shift registers 202-206 of the slaves with an address of n bits, and then writes m bits of data to the slaves. Accordingly, the serial shift registers 202-206 within (or otherwise coupled to) the slave devices may include: (1) n bits of address; (2) one bypass bit; and (3) m bits of data payload. Use of n address bits means that $2^n$ slaves can be accessed. At power on (or reset), the bypass bit of all slave devices is set to 0 (by default, or set to another value depending on the implementation). This results in the bypass bit and the address bits in all slave devices to appear as a shift register. The host/master is then able to shift data into the slaves in a serial manner and configure the address in each slave. After address configuration (which results in each slave having a unique address in an embodiment), the bypass bit is set to 1 (or otherwise marked to indicate the initial unique address assignment has concluded). Further data transfers (or accesses) are valid for each individual slave(s) if and only if the address for that slave is matched with the address transmitted by the host. All other slave devices in the chain ignore the transaction(s) not associated with their unique address.

Some embodiments provide one or more of the following advantages: (a) no individual hardwired slave addressing scheme is necessary (like chip select or pins); (b) no internal non-volatile memory is necessarily needed in each slave device to implement some embodiments; (c) slave access time is independent of the number of slave devices in the chain (e.g., this only depends on the number of address and data bits); (d) slave implementation for this scheme is simple (e.g., any complexity resides in the host); (e) configuration is needed only at power on (or reset) and lasts as long as the slaves are powered; (f) serial bus clock frequency can be varied dynamically (e.g., to meet board routing, slave/host configurations, or other considerations); and/or (g) error checking by read-back before write is possible for every transaction under the master's control (e.g., there is no fixed overhead for parity/CRC (Cyclic Redundancy Code) bits).

Figure 3:
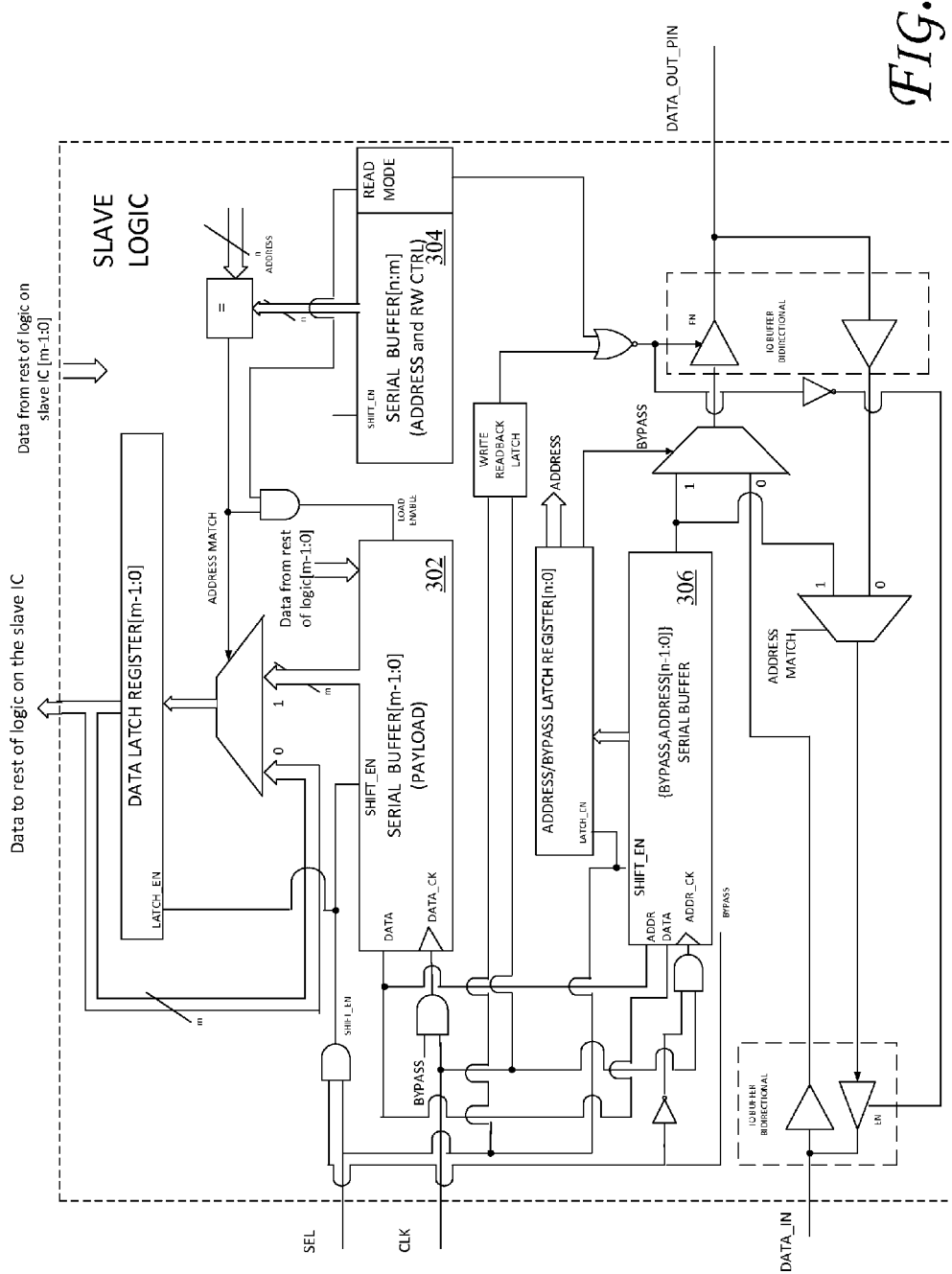
FIGS. 3 and 4 illustrate block diagrams of details of a slave logic, according to some embodiments.

FIG. 3 illustrates a block diagram of internal logic of a slave device, according to an embodiment. In an embodiment, each slave device discussed with reference to FIG. 2 includes the logic discussed with reference to FIG. 3. As shown in FIG. 3, the internal slave logic has two input pins labeled CLK and SEL and two bidirectional IO (Input/Output) pins labeled DATA_IN (input by default) and DATA_OUT (output by default). Each slave device also stores m bits of payload data provided to the rest of the logic on the slave IC (or other slave(s)), as well as m bits received from the rest of the logic on the slave IC (or other slave(s)).

As shown in FIG. 3, each slave device has two serial buffers/shift registers (302 and 304) m and n bits long for the payload and address, respectively, during normal operation (also referred to as "runtime" herein), and another serial buffer (306) being n bits long for the address to be stored during initialization. Both shift registers/serial buffers for runtime shift data to the right (or left depending on the implementation) on the rising edge (or falling edge depending on the implementation) of the CLK signal, when SEL=1 and other conditions described herein are met. The address latch register (with n bits for address storage during initialization) shifts data only when BYPASS=0. The serial buffer for the payload and the serial buffer for the address during normal operation shift data only when BYPASS=1. Accordingly, the address and data latches are transparent when SEL=0. As shown in FIG. 3, each slave logic may also include other logic such as multiplexers, drivers, inverters, latches, logic AND gates, comparators, etc.

Figure 4:
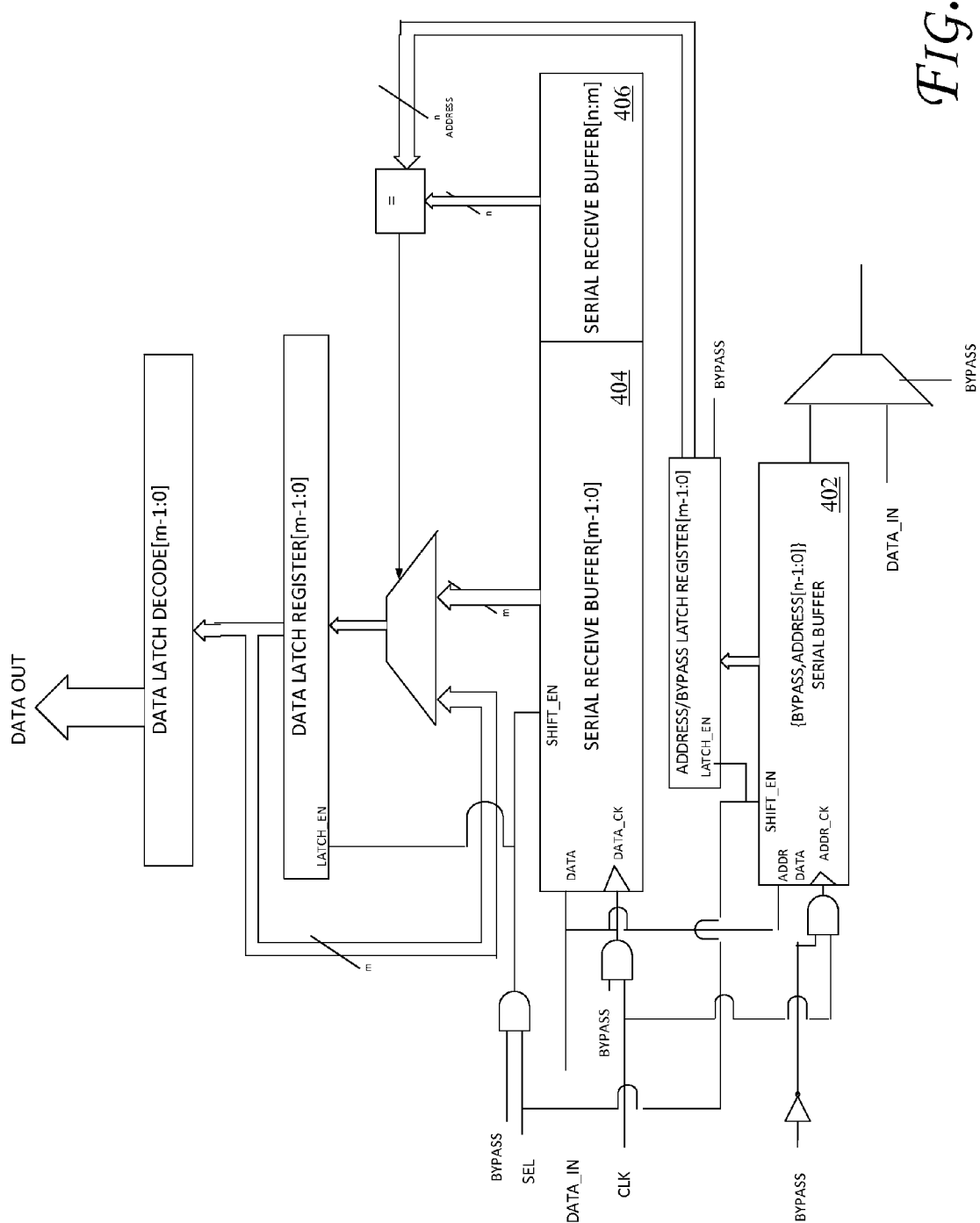

FIG. 4 illustrates a block diagram of internal logic of a slave device, according to an embodiment. In an embodiment, each slave device discussed with reference to FIG. 2 includes the logic discussed with reference to FIG. 4. As shown in FIG. 4, each slave device may include a serial buffer 402 (n bits long) implemented as a serial buffer/shift register to store the address assigned at initialization, a serial receive buffer 404 (m bits long) to store payload data, another serial receive buffer (to store the address during runtime), and other logic such as multiplexers, drivers, inverters, latches, logic AND gates, comparators, etc.

Referring to FIG. 4, at power on (or reset), BYPASS bit=0. The clock and data enables are enabled for the BYPASS and ADDRESS serial buffer 402. The host (e.g., logic 140) makes SEL=1, and then shifts data serially to its DATA pin. All slaves appear as a daisy chained serial shift register. The host shifts data into each of them, which contains n bits of address and 1 bit bypass which is set to 1. The host need not know the number of slaves present as it can send addresses from $2^{n-1}$ to 0. Any addresses corresponding to absent slaves will be lost as they will be shifted out of the last slave. In an embodiment, the slave first in the daisy chain may be assigned an address of 0, the next slave being assigned address 1, and so on. After all slaves have been written, the host makes SEL=0. This latches the addresses and bypass bit in each slave. From this point on, DATA_OUT for each slave is connected to DATA_IN.

Figure 5:
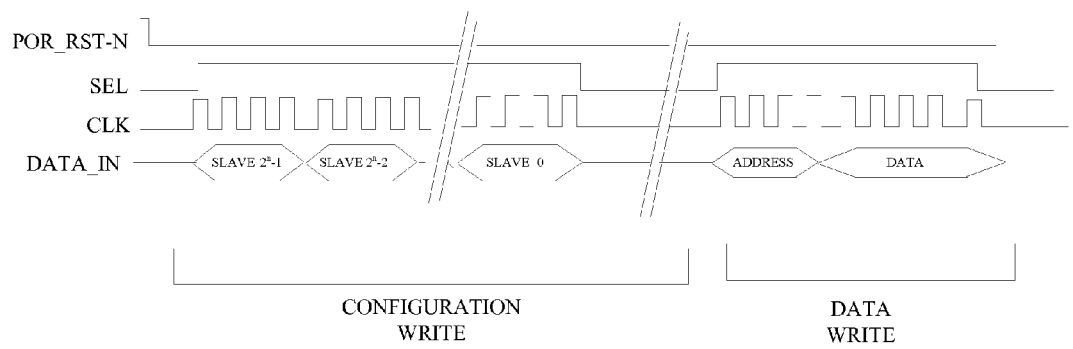

FIGS. 5 through 10 illustrate sample timing diagrams, according to some embodiments. More specifically, FIG. 5 shows a timing diagram for a configuration write cycle and a subsequent data write cycle, according to an embodiment. For address initialization (e.g., as discussed with reference to FIGS. 2-4), FIG. 5 illustrates a sample timing diagram for the cycle that takes place once at power on (or reset) for a configuration write cycle, which is not repeated again. At power on reset (labeled as POR-RST-N), BYPASS bit=0. The clock and data enables are enabled for the BYPASS and ADDRESS serial buffer. The host makes SEL=1, and then shifts data serially to its DATA pin. All slaves appear as a daisy chained serial shift register. The host shifts data into each of them, which contains n bits of address and 1 bit bypass which is set to 1. The host need not know the number of slaves present as it can send addresses from $2^{n-1}$ to 0. Any addresses corresponding to absent slaves will be lost as they will be shifted out of the last slave. For example, the slave first in the daisy chain receives an address of 0, the next slave receives address 1 and, so on. After all slaves have been written, the host makes SEL=0. This latches the addresses and bypass bit in each slave. From this point on, DATA_OUT for each slave is connected to DATA_IN, as BYPASS bit is 1.

Figure 6:
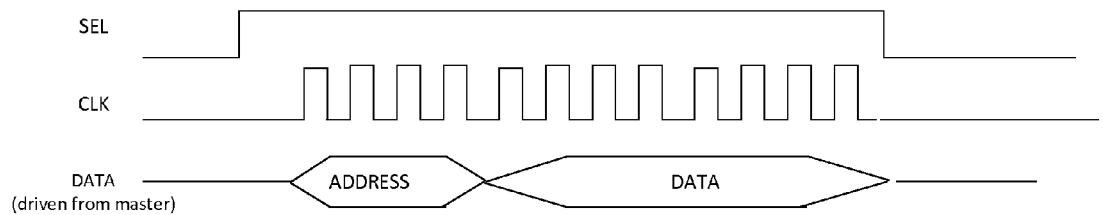

FIG. 6 shows a timing diagram for a normal write cycle (e.g., with no read-back to confirm data), according to an embodiment. For normal write operations, the host sends n bits of address and m bits of payload data when it accesses an individual slave. All slaves are accessed at the same time as the DATA_OUT is the same, as DATA_IN (except for any signal routing delays). In case the address matches, the individual slave data is updated on the falling edge of SEL signal. The falling edge of the SEL signal occurs after the falling edge of the last clock cycle to indicate this write cycle has no read-back following it in an embodiment.

Figure 7:
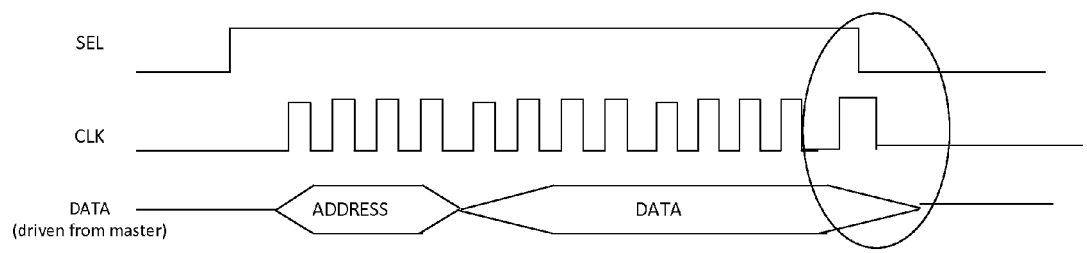

FIG. 7 shows a timing diagram for a confirmed write cycle, according to an embodiment. In an embodiment, FIG. 7 illustrates the first part of a confirmed write cycle according to an embodiment. A confirmed write permits the master to read back the data written to prove that it is correct before latching the data. The master makes SEL=1 to start the transaction. All slaves are accessed at the same time as the DATA_OUT is same as DATA_IN (except for any signal routing delays). In contrast to the write cycle of FIG. 6, in this case during the last clock cycle the master makes SEL=0 before the falling edge of the clock. This causes the data not to be latched, but the data is stored in the shift register. It also makes DATA_IN of the slave as an output and DATA_OUT as an input. Hence, the master also changes the direction of its DATA pin from output to input pin.

Figure 8:
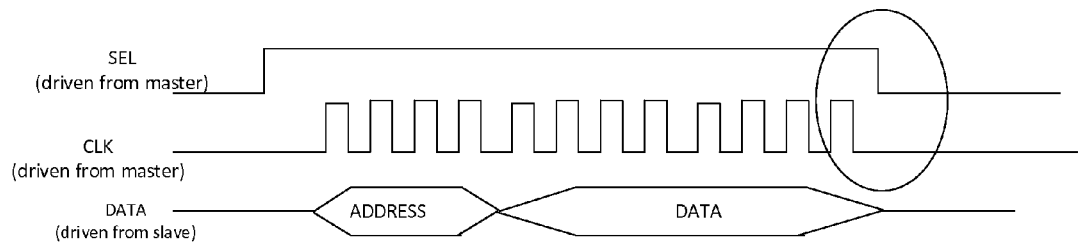

FIG. 8 shows a timing diagram for a confirmed write cycle, according to an embodiment. In an embodiment, FIG. 8 illustrates the second part of a confirmed write cycle according to an embodiment. During the second part of the confirmed write cycle as the data direction is reversed, the master generates the CLK and SEL signals. Whichever slave device had an address match and runs its shift register on the first cycle, drives its data out on the DATA_IN pin. Other slaves drive the DATA_OUT value on the DATA_IN pin. The master can read back the address and data it has written and check if it is what is expected. If it is correct, the master can make the CLK falling edge before the SEL falling edge to latch the data in the slave; otherwise, the master makes the CLK falling edge after the SEL falling edge to avoid latching the data. In either case, the DATA_IN pin becomes input and DATA_OUT becomes output. In case there has been an error detected during the write operation, the master can try again.

FIG. 9 shows a timing diagram for a read back cycle, according to an embodiment. In an embodiment, FIG. 9 illustrates the first part of a read back cycle according to an embodiment. As shown in FIG. 9, the master first performs a write cycle to latch the read bit as 1 (where in all other transactions the read bit is 0). This causes the DATA_IN pin of the slave to go from input to output and the DATA_OUT pin to go from output to input in all slaves. The master can write data to the slave in this cycle as well if needed.

FIG. 10 shows a timing diagram for a read back cycle, according to an embodiment. In an embodiment, FIG. 10 illustrates the second part of a read back cycle according to an embodiment. As shown in FIG. 10, the master reads back the data from the slave which consists of the address, as well as the read back data. The address field is used to ensure that in case of errors the read back operation is from the correct slave.

In an embodiment, compatibility with error checking codes is provided. For example, if required for further error prevention, the address data sent by the master can be padded with a parity or CRC bit(s). In case the error check fails, the slave can consider it as a mismatched address and not latch the data. The slave may also use an error checking code when sending data to the master.

Furthermore, an embodiment may provide clock skew and/or frequency optimization. For example, to provide correct system operation, the setup and hold time for each slave has to be met. As the DATA and CLK pins are routed separately on the board, it is possible that mismatched signal transmission delays may cause timing violations in the chain. One way to avoid this is for the master to change its DATA on the falling edge of the clock so that the data has half of a clock cycle to reach the slave in time for the rising edge. This also prevents race conditions between CLK and DATA due to signal routing delays. Further, the maximum frequency of operation may be such that half a clock cycle is equal to the worst case mismatch between clock and data in some implementations.

In one embodiment, the system can be optimized further by performing a write operation of alternating 0 and 1 pattern without latching and then performing a read back operation. That will show the skew between CLK and DATA and can be used by the master to delay sending or capturing data. This will may provide the highest usable clock frequency. The master can also try one clock frequency, and then reduce the frequency in case of errors (or increase the frequency in case of no error until an optimum frequency is reached with no errors).

Some embodiments provide one or more of the following benefits: (a) the slave logic is very simple compared to an I2C slave as it has no bus priority and arbitration logic (hence it has low area and power); (b) the slave does not need (e.g., flash) memory or extra pins to configure the address, for example, at power on (or reset); (c) the host need not know the number of slaves coupled to it during the address configuration cycle (which may help if the slave is a flash memory that holds system configuration information, or in another case where the slave is a voltage regulator powering the aforementioned flash memory); (d) the actual write cycle is very fast (e.g., to access a particular slave, the host only needs to send m plus n bits regardless of the number of slaves); (e) the exact time of the write operation may be controlled with the falling edge of SEL signal and there is no possibility for the slave stretching the pulse unlike I2C; (f) the host may change the clock frequency for write or read operations to overcome signal routing delays and/or (e.g., random) errors; (g) a confirmed write operation with full read back is possible (which may provide a much better error immunity than other protocols); (h) provide an option for confirmed write or normal write operation for individual transaction (e.g., where the master may decide individually, e.g., based on the importance of data being sent, which is unlike error checking or correcting code based systems where the delay due to error bits is always present even when not needed); (i) provide a mechanism for optimizing clock frequency (e.g., high enough to provide the fastest operation but low enough to avoid errors); (j) use of minimal logic on slave compared to I2C/SM bus or even USB (Universal Serial Bus); (k) utilizes a single pin for write and read back operations; and/or (l) static power consumption is 0.

Accordingly, some embodiments may reduce platform cost, provide opportunities to increase battery life (due to better power management), and/or provide an opportunity to monetize a small part of the cost savings by reducing cost of slave devices.

Figure 11:
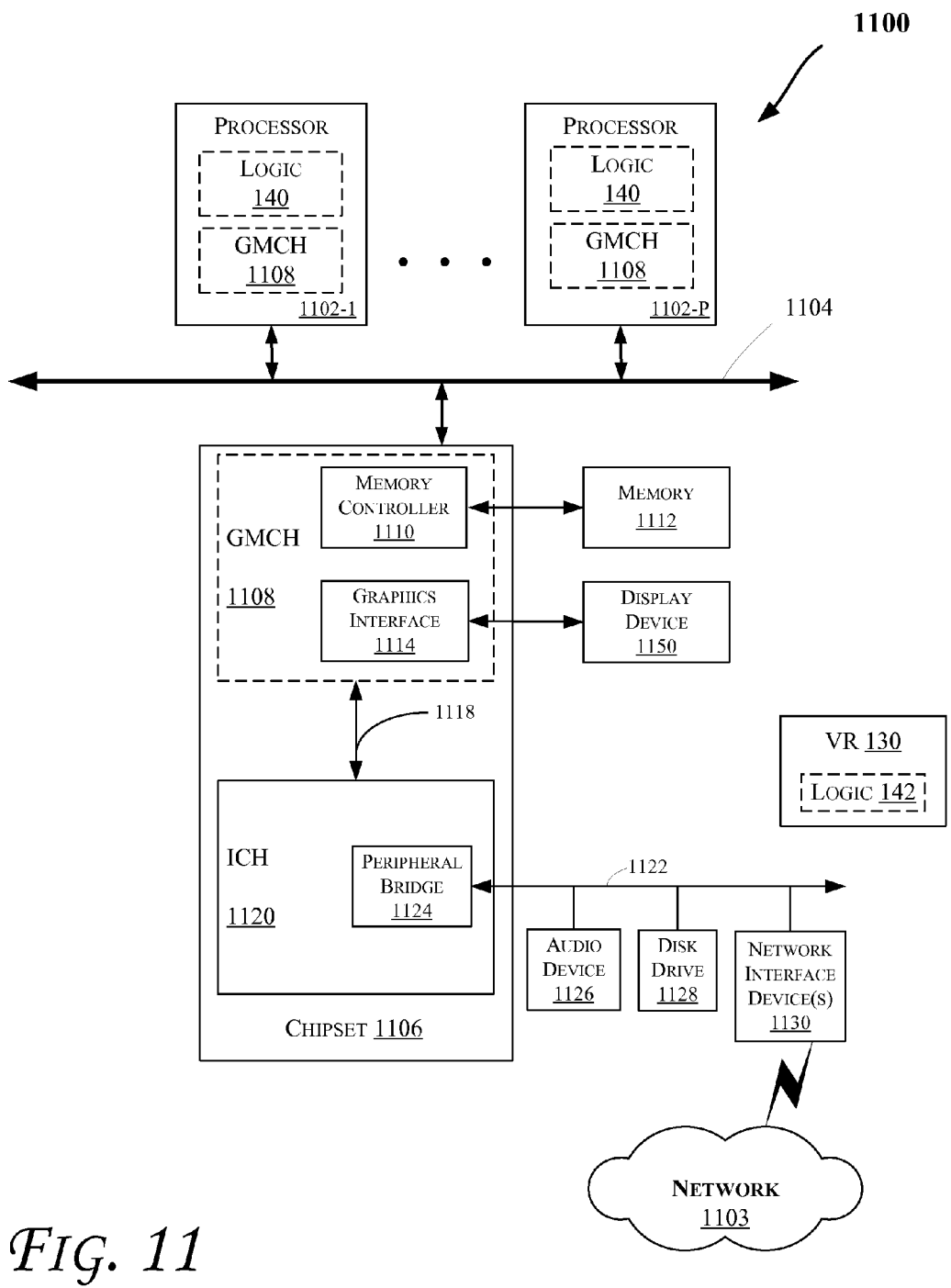

FIG. 11 illustrates a block diagram of a computing system 1100 in accordance with an embodiment. The computing system 1100 may include one or more central processing unit(s) (CPUs) or processors 1102-1 through 1102-P (which may be referred to herein as "processors 1102" or "processor 1102"). The processors 1102 may communicate via an interconnection network (or bus) 1104. The processors 1102 may include a general purpose processor, a network processor (that processes data communicated over a computer network 1103), or other types of a processor (including a reduced instruction set computer (RISC) processor or a complex instruction set computer (CISC)).

Moreover, the processors 1102 may have a single or multiple core design. The processors 1102 with a multiple core design may integrate different types of processor cores on the same integrated circuit (IC) die. Also, the processors 1102 with a multiple core design may be implemented as symmetrical or asymmetrical multiprocessors. In an embodiment, one or more of the processors 1102 may be the same or similar to the processors 102 of FIG. 1. In some embodiments, one or more of the processors 1102 may include one or more of the cores 106, logic 140 and/or 142, and sensor(s) 150, of FIG. 1. Also, the operations discussed with reference to FIGS. 1-10 may be performed by one or more components of the system 1100. For example, a slave device (such as voltage regulator 130 of FIG. 1 coupled to logic 142) operate at the direction of logic 140.

A chipset 1106 may also communicate with the interconnection network 1104. The chipset 1106 may include a graphics and memory control hub (GMCH) 1108. The GMCH 1108 may include a memory controller 1110 that communicates with a memory 1112. The memory 1112 may store data, including sequences of instructions that are executed by the processor 1102, or any other device included in the computing system 1100. In one embodiment, the memory 1112 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1104, such as multiple CPUs and/or multiple system memories.

The GMCH 1108 may also include a graphics interface 1114 that communicates with a display device 1150, e.g., a graphics accelerator. In one embodiment, the graphics interface 1114 may communicate with the display device 1150 via an accelerated graphics port (AGP) or Peripheral Component Interconnect (PCI) (or PCI express (PCIe) interface). In an embodiment, the display device 1150 (such as a flat panel display (such as an LCD (Liquid Crystal Display), a cathode ray tube (CRT), a projection screen, etc.) may communicate with the graphics interface 1114 through, for example, a signal converter that translates a digital representation of an image stored in a storage device such as video memory or system memory into display signals that are interpreted and displayed by the display. The display signals produced may pass through various control devices before being interpreted by and subsequently displayed on the display device 1150.

A hub interface 1118 may allow the GMCH 1108 and an input/output control hub (ICH) 1120 to communicate. The ICH 1120 may provide an interface to I/O devices that communicate with the computing system 1100. The ICH 1120 may communicate with a bus 1122 through a peripheral bridge (or controller) 1124, such as a peripheral component interconnect (PCI) bridge, a universal serial bus (USB) controller, or other types of peripheral bridges or controllers. The bridge 1124 may provide a data path between the processor 1102 and peripheral devices. Other types of topologies may be utilized. Also, multiple buses may communicate with the ICH 1120, e.g., through multiple bridges or controllers. Moreover, other peripherals in communication with the ICH 1120 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1122 may communicate with an audio device 1126, one or more disk drive(s) 1128, and one or more network interface device(s) 1130 (which is in communication with the computer network 1103). Other devices may communicate via the bus 1122. Also, various components (such as the network interface device 1130) may communicate with the GMCH 1108 in some embodiments. In addition, the processor 1102 and the GMCH 1108 may be combined to form a single chip. Furthermore, the graphics accelerator may be included within the GMCH 1108 in other embodiments.

Furthermore, the computing system 1100 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1128), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 1100 may be arranged in a point-to-point (PtP) configuration. For example, processors, memory, and/or input/output devices may be interconnected by a number of point-to-point interfaces.

Figure 12:
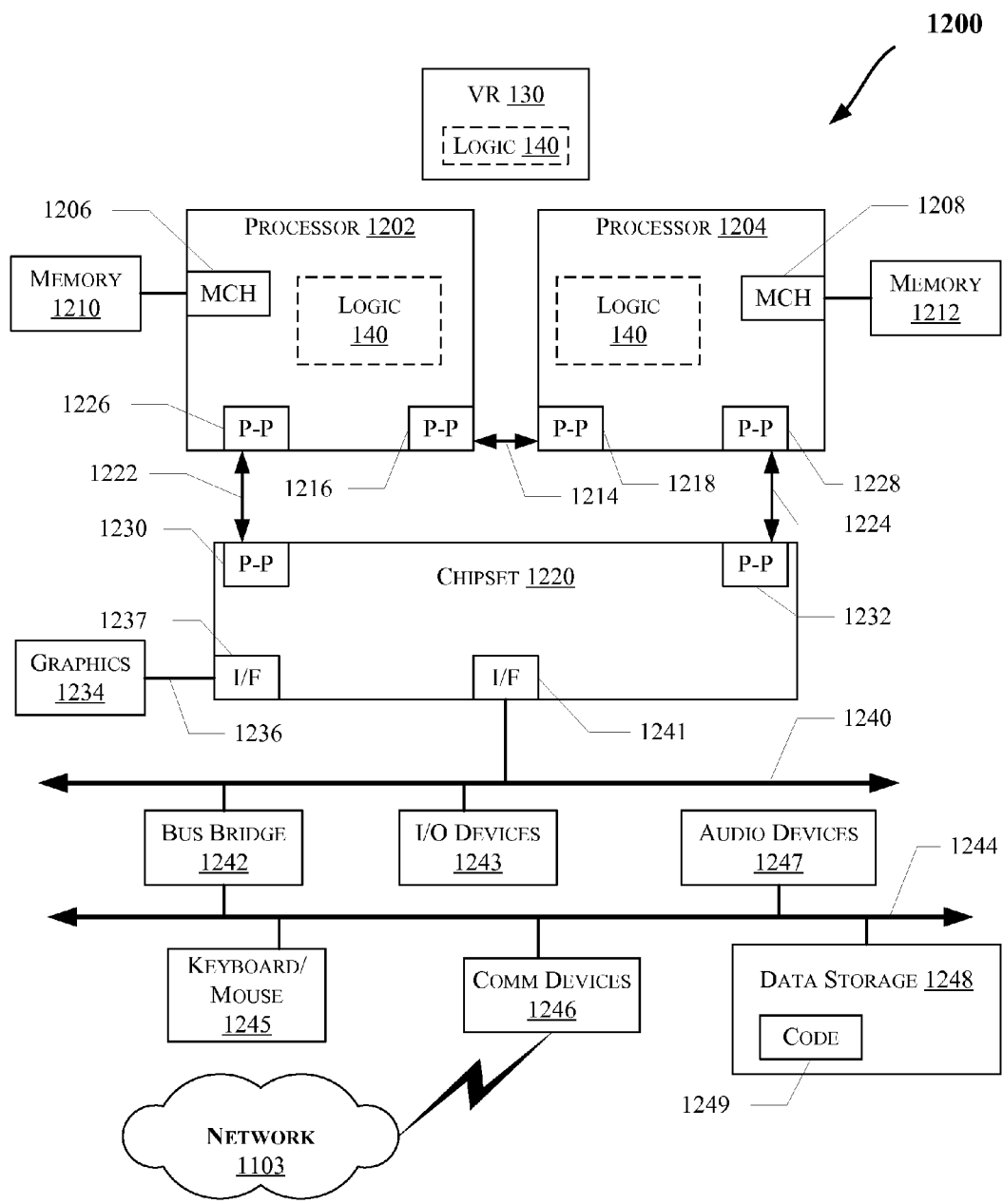

FIG. 12 illustrates a computing system 1200 that is arranged in a point-to-point (PtP) configuration, according to an embodiment. In particular, FIG. 12 shows a system where processors, memory, and input/output devices are interconnected by a number of point-to-point interfaces. The operations discussed with reference to FIGS. 1-11 may be performed by one or more components of the system 1200. For example, a voltage regulator (such as VR 130 of FIG. 1 coupled to logic 142) may regulate voltage supplied to one or more components of FIG. 12 at the direction of logic 140.

As illustrated in FIG. 12, the system 1200 may include several processors, of which only two, processors 1202 and 1204 are shown for clarity. The processors 1202 and 1204 may each include a local memory controller hub (MCH) 1206 and 1208 to enable communication with memories 1210 and 1212. The memories 1210 and/or 1212 may store various data such as those discussed with reference to the memory 1112 of FIG. 11. Also, the processors 1202 and 1204 may include one or more of the cores 116, logic 140 and/or 142, and/or sensor(s) 150 of FIG. 1.

In an embodiment, the processors 1202 and 1204 may be one of the processors 1102 discussed with reference to FIG. 11. The processors 1202 and 1204 may exchange data via a point-to-point (PtP) interface 1214 using PtP interface circuits 1216 and 1218, respectively. Also, the processors 1202 and 1204 may each exchange data with a chipset 1220 via individual PtP interfaces 1222 and 1224 using point-to-point interface circuits 1226, 1228, 1230, and 1232. The chipset 1220 may further exchange data with a high-performance graphics circuit 1234 via a high-performance graphics interface 1236, e.g., using a PtP interface circuit 1237.

In at least one embodiment, one or more operations discussed with reference to FIGS. 1-11 may be performed by the processors 1202 or 1204 and/or other components of the system 1200 such as those communicating via a bus 1240. Other embodiments, however, may exist in other circuits, logic units, or devices within the system 1200 of FIG. 12. Furthermore, some embodiments may be distributed throughout several circuits, logic units, or devices illustrated in FIG. 12.

Chipset 1220 may communicate with the bus 1240 using a PtP interface circuit 1241. The bus 1240 may have one or more devices that communicate with it, such as a bus bridge 1242 and I/O devices 1243. Via a bus 1244, the bus bridge 1242 may communicate with other devices such as a keyboard/mouse 1245, communication devices 1246 (such as modems, network interface devices, or other communication devices that may communicate with the computer network 1103), audio I/O device, and/or a data storage device 1248. The data storage device 1248 may store code 1249 that may be executed by the processors 1202 and/or 1204.

Figure 13:
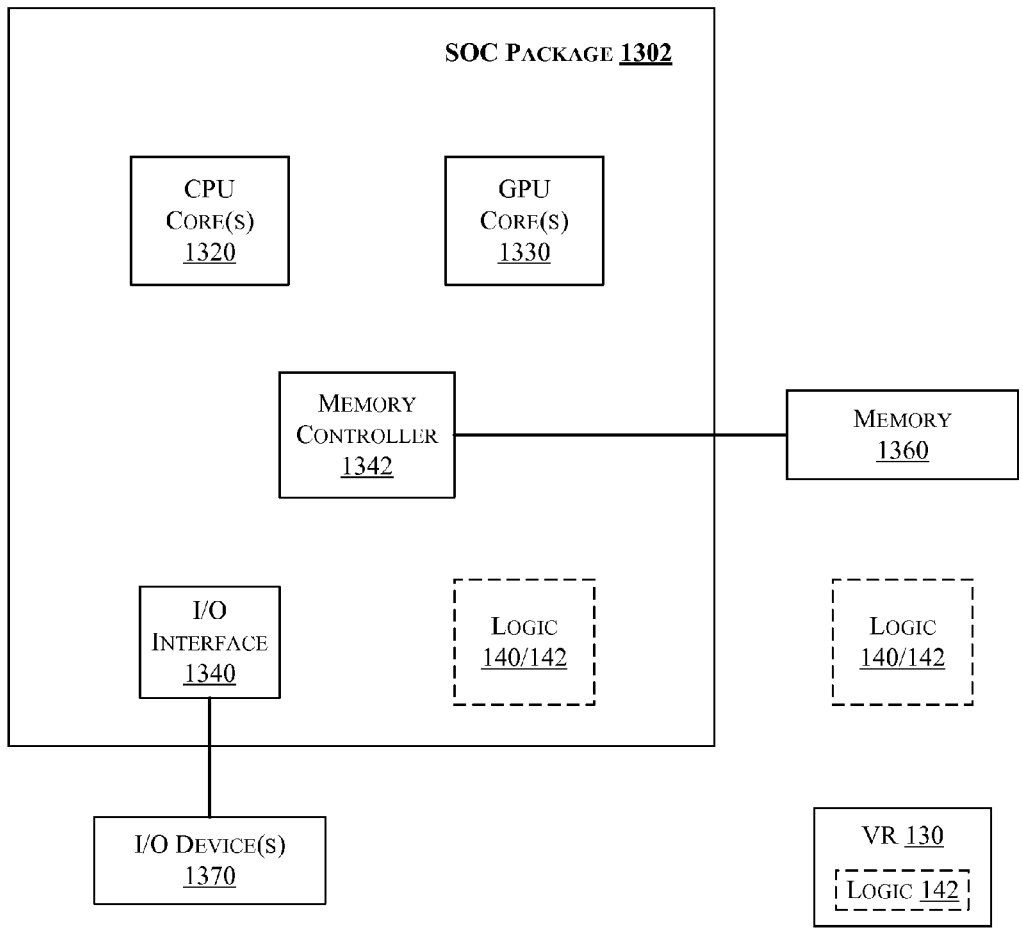

In some embodiments, one or more of the components discussed herein can be embodied as a System On Chip (SOC) device. FIG. 13 illustrates a block diagram of an SOC package in accordance with an embodiment. As illustrated in FIG. 13, SOC 1302 includes one or more Central Processing Unit (CPU) cores 1320, one or more Graphics Processor Unit (GPU) cores 1330, an Input/Output (I/O) interface 1340, and a memory controller 1342. Various components of the SOC package 1302 may be coupled to an interconnect or bus such as discussed herein with reference to the other figures. Also, the SOC package 1302 may include more or less components, such as those discussed herein with reference to the other figures. Further, each component of the SOC package 1320 may include one or more other components, e.g., as discussed with reference to the other figures herein. In one embodiment, SOC package 1302 (and its components) is provided on one or more Integrated Circuit (IC) die, e.g., which are packaged into a single semiconductor device.

As illustrated in FIG. 13, SOC package 1302 is coupled to a memory 1360 (which may be similar to or the same as memory discussed herein with reference to the other figures) via the memory controller 1342. In an embodiment, the memory 1360 (or a portion of it) can be integrated on the SOC package 1302.

The I/O interface 1340 may be coupled to one or more I/O devices 1370, e.g., via an interconnect and/or bus such as discussed herein with reference to other figures. I/O device(s) 1370 may include one or more of a keyboard, a mouse, a touchpad, a display, an image/video capture device (such as a camera or camcorder/video recorder), a touch screen, a speaker, or the like. Furthermore, SOC package 1302 may include/integrate the logic 140 and/or 142 in an embodiment. Alternatively, the logic 140 and/or 142 may be provided outside of the SOC package 1302 (i.e., as a discrete logic).

The following examples pertain to further embodiments. Example 1 includes an apparatus comprising: logic, at least a portion of which is in hardware, to cause assignment of a unique address to each of a plurality of slave devices, wherein the plurality of slave devices are to be coupled in a daisy chain configuration and wherein an access directed at a first slave device from the plurality of slave devices is to be allowed based at least in part on comparison of an address of the first slave device and an address associated with the access. Example 2 includes the apparatus of example 1, wherein the logic is to be coupled to a first slave device of the plurality of devices via a single bidirectional communication pin. Example 3 includes the apparatus of example 1, comprising logic to read back data to be stored in one of the plurality of slave devices prior to latching the data in that slave device. Example 4 includes the apparatus of example 1, wherein each of the plurality of slave devices is to comprise no more than three communication pins, wherein one of the three communication pins is a bidirectional communication pin. Example 5 includes the apparatus of example 4, comprising logic to cause a change in use of the bidirectional communication pin for input data or output data. Example 6 includes the apparatus of example 4, wherein two of the three communication pins are unidirectional and couple the logic to each of the plurality of slave devices. Example 7 includes the apparatus of example 6, wherein the two communication pins are to comprise a clock pin and a select pin. Example 8 includes the apparatus of example 7, wherein each of the plurality of slave devices is to receive data in response to assertion of a signal on the select pin. Example 9 includes the apparatus of example 1, comprising logic to dynamically adjust a frequency of a clock signal for each access to the plurality of the slave devices. Example 10 includes the apparatus of example 1, wherein each of the plurality of the slave devices is to comprise a plurality of shift registers to store a unique address, for a corresponding slave device, and a data payload. Example 11 includes the apparatus of example 1, wherein each of the plurality of the slave devices is to comprise a shift register to store a bypass bit, wherein the bypass bit is to cause the plurality of the slave devices to appear as a shift register to the logic at power on or reset of a computing system that includes the plurality of the slave devices. Example 12 includes the apparatus of example 1, comprising logic to read back data to be stored in one of the plurality of slave devices prior to latching the data in that slave device on a per transaction basis. Example 13 includes the apparatus of example 1, wherein the logic is to cause assignment of unique addresses to the plurality of slave devices at power on or rest of a computing system that includes the plurality of the slave devices. Example 14 includes the apparatus of example 1, wherein a serial interface is to couple the plurality of slave devices in the daisy chain configuration. Example 15 includes the apparatus of example 1, wherein a power management logic is to comprise the logic. Example 16 includes the apparatus of example 1, wherein one of a voltage regulator, a power supply, a power management unit, or a reprogrammable power management integrated circuit is to comprise the logic. Example 17 includes the apparatus of example 1, wherein a host computing system or a master device is to comprise the logic. Example 18 includes the apparatus of example 1, wherein one or more of: the logic, a processor, and memory are on a single integrated circuit.

Example 19 includes a method comprising: causing assignment of a unique address to each of a plurality of slave devices, wherein the plurality of slave devices are coupled in a daisy chain configuration and wherein an access directed at a first slave device from the plurality of slave devices is allowed based at least in part on comparison of an address of the first slave device and an address associated with the access. Example 20 includes the method of example 19, further comprising reading back data to be stored in one of the plurality of slave devices prior to latching the data in that slave device. Example 21 includes the method of example 19, further comprising causing a change in use of a bidirectional communication pin of the plurality of slave devices for input data or output data. Example 22 includes the method of example 19, further comprising dynamically adjusting a frequency of a clock signal for each access to the plurality of the slave devices.

Example 23 includes a computer-readable medium comprising one or more instructions that when executed on a processor configure the processor to perform one or more operations to: cause assignment of a unique address to each of a plurality of slave devices, wherein the plurality of slave devices are coupled in a daisy chain configuration and wherein an access directed at a first slave device from the plurality of slave devices is allowed based at least in part on comparison of an address of the first slave device and an address associated with the access. Example 24 includes the computer-readable medium of example 23, further comprising one or more instructions that when executed on the processor configure the processor to perform one or more operations to read back data to be stored in one of the plurality of slave devices prior to latching the data in that slave device. Example 25 includes the computer-readable medium of example 23, further comprising one or more instructions that when executed on the processor configure the processor to perform one or more operations to cause a change in use of a bidirectional communication pin of the plurality of slave devices for input data or output data.

Example 26 includes a system comprising: a processor, having one or more processor cores; memory, coupled to the processor, to store one or more instructions to be executed by the processor; and logic to cause assignment of a unique address to each of a plurality of slave devices, wherein the plurality of slave devices are to be coupled in a daisy chain configuration and wherein an access directed at a first slave device from the plurality of slave devices is to be allowed based at least in part on comparison of an address of the first slave device and an address associated with the access. Example 27 includes the system of example 26, wherein the logic is to be coupled to a first slave device of the plurality of devices via a single bidirectional communication pin. Example 28 includes the system of example 26, comprising logic to read back data to be stored in one of the plurality of slave devices prior to latching the data in that slave device. Example 29 includes the system of example 26, wherein each of the plurality of slave devices is to comprise no more than three communication pins, wherein one of the three communication pins is a bidirectional communication pin. Example 30 includes the system of example 29, comprising logic to cause a change in use of the bidirectional communication pin for input data or output data. Example 31 includes the system of example 29, wherein two of the three communication pins are unidirectional and couple the logic to each of the plurality of slave devices. Example 32 includes the system of example 31, wherein the two communication pins are to comprise a clock pin and a select pin. Example 33 includes the system of example 32, wherein each of the plurality of slave devices is to receive data in response to assertion of a signal on the select pin. Example 34 includes the system of example 26, comprising logic to dynamically adjust a frequency of a clock signal for each access to the plurality of the slave devices. Example 35 includes the system of example 26, wherein each of the plurality of the slave devices is to comprise a plurality of shift registers to store a unique address, for a corresponding slave device, and a data payload. Example 36 includes the system of example 26, wherein each of the plurality of the slave devices is to comprise a shift register to store a bypass bit, wherein the bypass bit is to cause the plurality of the slave devices to appear as a shift register to the logic at power on or reset of a computing system that includes the plurality of the slave devices. Example 37 includes the system of example 26, comprising logic to read back data to be stored in one of the plurality of slave devices prior to latching the data in that slave device on a per transaction basis. Example 38 includes the system of example 26, wherein the logic is to cause assignment of unique addresses to the plurality of slave devices at power on or rest of a computing system that includes the plurality of the slave devices. Example 39 includes the system of example 26, wherein a serial interface is to couple the plurality of slave devices in the daisy chain configuration. Example 40 includes the system of example 26, wherein a power management logic is to comprise the logic. Example 41 includes the system of example 26, wherein one of a voltage regulator, a power supply, a power management unit, or a reprogrammable power management integrated circuit is to comprise the logic. Example 42 includes the system of example 26, wherein a host computing system or a master device is to comprise the logic. Example 43 includes the system of example 26, wherein one or more of: the logic, the processor, and memory are on a single integrated circuit.

Example 44 includes an apparatus comprising means to perform a method as set forth in any preceding example.

Example 45 comprises machine-readable storage including machine-readable instructions, when executed, to implement a method or realize an apparatus as set forth in any preceding example.

In various embodiments, the operations discussed herein, e.g., with reference to FIGS. 1-13, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-13.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    logic, at least a portion of which is in hardware, to cause assignment of a unique address to each of a plurality of slave devices,
    wherein the plurality of slave devices are to be coupled in a daisy chain configuration and wherein an access directed at a first slave device from the plurality of slave devices is to be allowed based at least in part on comparison of an address of the first slave device and an address associated with the access, wherein frequency of a clock signal for each access to the plurality of the slave devices is to be dynamically adjusted.

2. The apparatus of claim 1, wherein the logic is to be coupled to a first slave device of the plurality of devices via a single bidirectional communication pin.

3. The apparatus of claim 1, comprising logic to read back data to be stored in one of the plurality of slave devices prior to latching the data in that slave device.

4. The apparatus of claim 1, wherein each of the plurality of slave devices is to comprise no more than three communication pins, wherein one of the three communication pins is a bidirectional communication pin.

5. The apparatus of claim 4, comprising logic to cause a change in use of the bidirectional communication pin for input data or output data.

6. The apparatus of claim 4, wherein two of the three communication pins are unidirectional and couple the logic to each of the plurality of slave devices.

7. The apparatus of claim 6, wherein the two communication pins are to comprise a clock pin and a select pin.

8. The apparatus of claim 7, wherein each of the plurality of slave devices is to receive data in response to assertion of a signal on the select pin.

9. The apparatus of claim 1, wherein each of the plurality of the slave devices is to comprise a plurality of shift registers to store a unique address, for a corresponding slave device, and a data payload.

10. The apparatus of claim 1, wherein each of the plurality of the slave devices is to comprise a shift register to store a bypass bit, wherein the bypass bit is to cause the plurality of the slave devices to appear as a shift register to the logic at power on or reset of a computing system that includes the plurality of the slave devices.

11. The apparatus of claim 1, comprising logic to read back data to be stored in one of the plurality of slave devices prior to latching the data in that slave device on a per transaction basis.

12. The apparatus of claim 1, wherein the logic is to cause assignment of unique addresses to the plurality of slave devices at power on or rest of a computing system that includes the plurality of the slave devices.

13. The apparatus of claim 1, wherein a serial interface is to couple the plurality of slave devices in the daisy chain configuration.

14. The apparatus of claim 1, wherein a power management logic is to comprise the logic.

15. The apparatus of claim 1, wherein one of a voltage regulator, a power supply, a power management unit, or a reprogrammable power management integrated circuit is to comprise the logic.

16. The apparatus of claim 1, wherein a host computing system or a master device is to comprise the logic.

17. The apparatus of claim 1, wherein one or more of: the logic, a processor, and memory are on a single integrated circuit.

18. A method comprising:
causing assignment of a unique address to each of a plurality of slave devices,
wherein the plurality of slave devices are coupled in a daisy chain configuration and wherein an access directed at a first slave device from the plurality of slave devices is allowed based at least in part on comparison of an address of the first slave device and an address associated with the access, wherein frequency of a clock signal for each access to the plurality of the slave devices is dynamically adjusted.

19. The method of claim 18, further comprising reading back data to be stored in one of the plurality of slave devices prior to latching the data in that slave device.

20. The method of claim 18, further comprising causing a change in use of a bidirectional communication pin of the plurality of slave devices for input data or output data.

21. A non-transitory computer-readable medium comprising one or more instructions that when executed on a processor configure the processor to perform one or more operations to:
cause assignment of a unique address to each of a plurality of slave devices,
wherein the plurality of slave devices are coupled in a daisy chain configuration and wherein an access directed at a first slave device from the plurality of slave devices is allowed based at least in part on comparison of an address of the first slave device and an address associated with the access, wherein frequency of a clock signal for each access to the plurality of the slave devices is dynamically adjusted.

22. The non-transitory computer-readable medium of claim 21, further comprising one or more instructions that when executed on the processor configure the processor to perform one or more operations to read back data to be stored in one of the plurality of slave devices prior to latching the data in that slave device.

23. The non-transitory computer-readable medium of claim 21, further comprising one or more instructions that when executed on the processor configure the processor to perform one or more operations to cause a change in use of a bidirectional communication pin of the plurality of slave devices for input data or output data.

24. An apparatus comprising:
logic, at least a portion of which is in hardware, to cause assignment of a unique address to each of a plurality of slave devices,
wherein the plurality of slave devices are to be coupled in a daisy chain configuration and wherein an access directed at a first slave device from the plurality of slave devices is to be allowed based at least in part on comparison of an address of the first slave device and an address associated with the access, wherein each of the plurality of the slave devices is to comprise a shift register to store a bypass bit, wherein the bypass bit is to cause the plurality of the slave devices to appear as a shift register to the logic at power on or reset of a computing system that includes the plurality of the slave devices.

25. The apparatus of claim 24, wherein one of a voltage regulator, a power supply, a power management unit, or a reprogrammable power management integrated circuit is to comprise the logic.

26. The apparatus of claim 24, wherein frequency of a clock signal for each access to the plurality of the slave devices is to be dynamically adjusted.

* * * * *